United States Patent
Kuo

(10) Patent No.: US 9,413,986 B1
(45) Date of Patent: Aug. 9, 2016

(54) VIDEO SWITCH AND SWITCHING METHOD THEREOF

(71) Applicant: ATEN International Co., Ltd., New Taipei (TW)

(72) Inventor: Huei-Jen Kuo, Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 14/922,511

(22) Filed: Oct. 26, 2015

(30) Foreign Application Priority Data

Jan. 27, 2015 (TW) ................................ 104102743 A

(51) Int. Cl.
*H04N 5/268* (2006.01)

(52) U.S. Cl.
CPC ..................... *H04N 5/268* (2013.01)

(58) Field of Classification Search
CPC . H04N 21/43635; H04N 5/765; H04N 5/268; H04N 5/44; G06F 13/4022; H04L 49/101
USPC ................. 348/705, 706; 710/316, 317, 241
IPC ...................................................... H04N 5/268
See application file for complete search history.

(56) References Cited

U.S. PATENT DOCUMENTS

| | | |
|---|---|---|
| 8,375,150 B2 | 2/2013 | Guillerm et al. |
| 2009/0079717 A1 | 3/2009 | Tsai |
| 2010/0177892 A1 | 7/2010 | Choi et al. |
| 2010/0315553 A1 | 12/2010 | Takatsuji et al. |
| 2011/0022739 A1 | 1/2011 | Guillerm et al. |
| 2011/0113442 A1 | 5/2011 | Kikkawa |
| 2011/0134330 A1 | 6/2011 | Yu et al. |
| 2012/0027203 A1 | 2/2012 | Inada |
| 2013/0151851 A1* | 6/2013 | Velasco ................. H04L 63/083 713/168 |

FOREIGN PATENT DOCUMENTS

| | | |
|---|---|---|
| CN | 101282444 B | 6/2011 |
| TW | I419006 | 12/2013 |

OTHER PUBLICATIONS

Extended European Search report, dated Mar. 3 2016, in a counterpart European patent application, No. EP 15196203.2.
Taiwanese Office Action, dated Mar. 29, 2016, in a counterpart Taiwanese patent application, No. 104102743.

* cited by examiner

*Primary Examiner* — Sherrie Hsia
(74) *Attorney, Agent, or Firm* — Chen Yoshimura LLP

(57) ABSTRACT

The present invention provides a video switch and a switching method thereof. The video switch comprises a first input port configured to transmit a first Transition Minimized Differential Signaling (TMDS) and a first Inter-Integrated Circuit (I2C) signal; a second input port configured to transmit a second Transition Minimized Differential Signaling (TMDS) and a second Inter-Integrated Circuit (I2C) signal; a first switch unit and a second switch unit. When switching the first input port to the second input port, the video switch firstly outputs the second Inter-Integrated Circuit (I2C) signal a specific time and then outputs the second Transition Minimized Differential Signaling (TMDS).

19 Claims, 5 Drawing Sheets

VIDEO SWITCH AND SWITCHING METHOD THEREOF

BACKGROUND OF THE INVENTION

1. Field of the Invention

This invention relates to a video switch and related switching method, and in particular, it relates to an asynchronous video switch and related switching method.

2. Description of Related Art

In recent years, HDMI interface, which is a digital transmission interface more efficient and faster than the DVI interface, has been developed. More and more digital audio and video equipment (such as playback device, display device, etc.) are now adopting this interface. Also, a High-Bandwidth Digital Content Protection (HDCP) standard is developed in recent years to protect copyright of digital audio and video content and prevent illegal duplication or spreading of such content during transmission or playing. The HDCP standard includes an authentication protocol; using such a protocol, the HDCP transmitting device (such as a playback device) can confirm whether a particular HDCP receiving device (e.g. a display device) is authorized to receive content protected by HDCP. When access right is confirmed, the content protected by HDCP security protection can be transmitted from the HDCP transmitting device to the HDCP receiving device using a shared secret key which is established during the authentication process, to prevent illegal capture of HDCP protected content by an illegitimate device.

However, as shown in FIG. 1, when the display device switches to a different image, for lower end televisions, the time required from reading the Extended Display Identification Data (EDID) and confirming the HDCP authentication data (i.e. the first authentication, "auth-1") to outputting the image is approximately 4 seconds. For higher end televisions, this time is approximately 1 to 2 seconds. Moreover, when switching images, the display screen is blank (i.e. no image is shown). These cause long delays and undesirable visual effect for the viewer.

SUMMARY

Accordingly, an object of the present invention is to provide a video switch, which includes: a first input port, including a first Transition Minimized Differential Signaling (TMDS) transmission channel for transmitting a first TMDS signal and a first Inter-Integrated Circuit (I2C) channel for transmitting a first I2C signal; a second input port, including a second TMDS transmission channel for transmitting a second TMDS signal and a second I2C channel for transmitting a second I2C signal; a first switch unit, coupled to the first I2C channel and the second I2C channel I2, being selectively switched to the first I2C channel to output the first I2C signal; and a second switch unit, coupled to the first TMDS transmission channel and the second TMDS transmission channel, being selectively switched to the first TMDS transmission channel to output the first TMDS signal.

When switching from the first input port to the second input port, the first switch unit is selectively switched to the second I2C channel to output the second I2C signal, and after a specified time period during which the first switch unit outputs the second I2C signal, the second switch unit outputs the second TMDS signal.

In another aspect, this invention provides a video switching method which includes: (A1) providing a video switch, which includes a first input port for transmitting a first TMDS signal and a first I2C signal and a second input port for transmitting a second TMDS signal and a second I2C signal; (A2) the video switch selecting the first input port to output the first TMDS signal and the first I2C signal; (A3) the video switch switching from the first input port to the second input port; and (A4) when switching from the first input port to the second input port, the video switch first outputting the second I2C signal for a specified period of time, and then outputting the second TMDS signal.

In another aspect, this invention provides a video switching method which includes: (B1) providing a video switch, including a first input port for receiving a first video signal from a first video source which contains a first TMDS signal, a second input port for receiving a second video signal from a second video source which contains a second TMDS signal, and an output port coupled to a display device for receiving the first or second video signal; (B2) the video switch selecting the first input port to output the first video signal; (B3) the video switch switching from the first input port to the second input port; and (B4) when switching from the first input port to the second input port, the video switch causing the second video source and the display device to perform I2C communication for a specified period of time, and then outputting the second TMDS signal to the display device.

Compared to conventional technologies, the video switch according to embodiments of the present invention use simple hardware and asynchronous switching of I2C and TMDS to achieve faster image out time with low cost, and can prevent the problem of blank screen during switching.

DETAILED DESCRIPTION OF PREFERRED EMBODIMENTS

Figure 1:
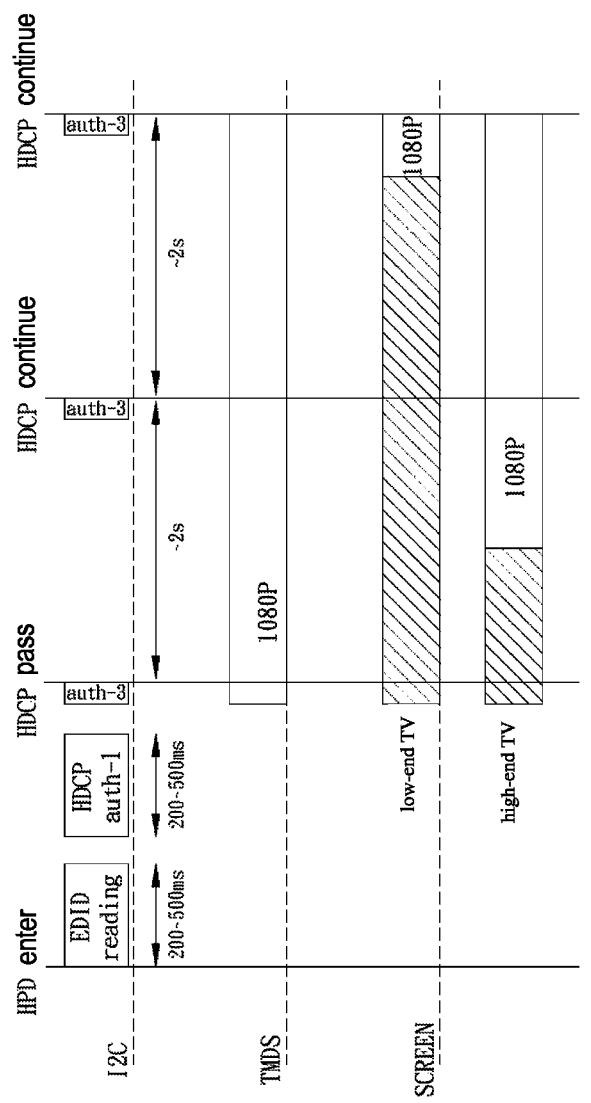
FIG. 1 schematically illustrates a conventional input port switching scheme.

Embodiments of the present invention are described below with reference to the drawings. While the embodiments are described in specific details, it should be understood that these specific details do not limit the scope of the present invention. Also, to avoid overcrowding in the drawings, some commonly known structural elements are shown schematically in the drawings.

Figure 2:
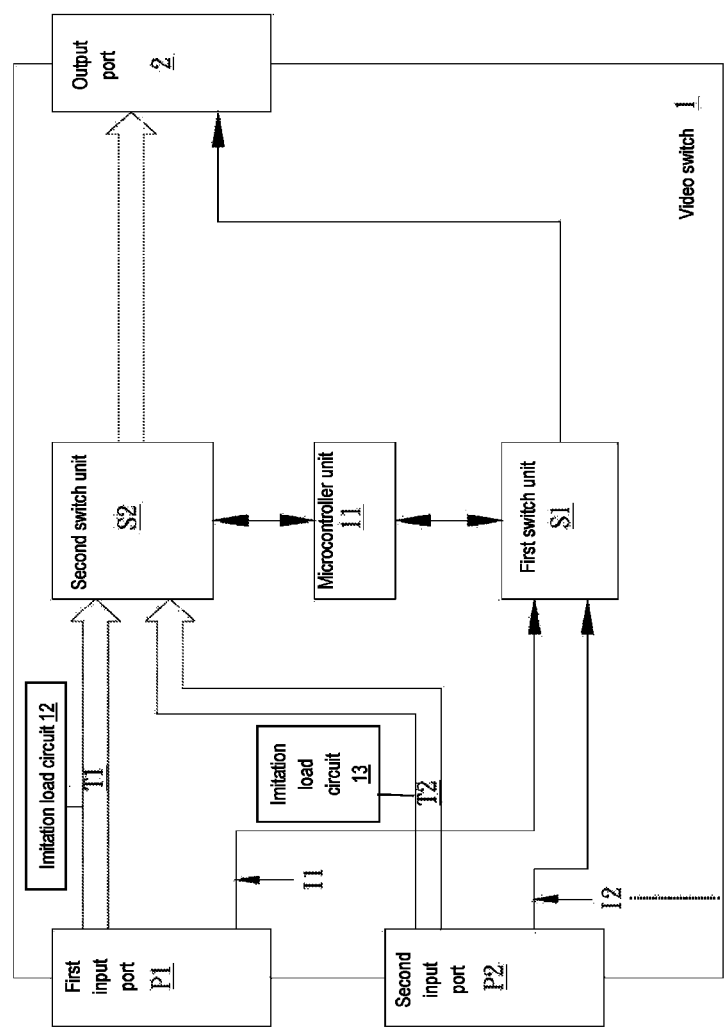
FIG. 2 is a schematic block diagram of a video switch according to an embodiment of the present invention.
Figure 3:
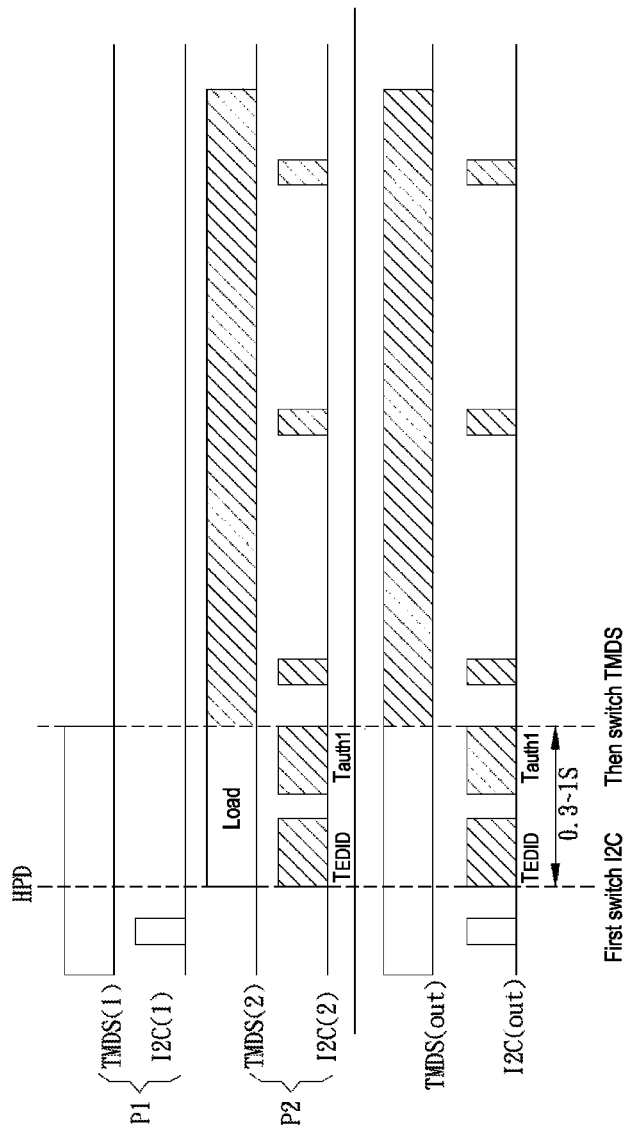
FIG. 3 schematically illustrates an input port switching scheme according to an embodiment of the present invention.

Refer to FIG. 2 and FIG. 3. FIG. 2 is a schematic block diagram of a video switch according to an embodiment of the present invention, and FIG. 3 schematically illustrates an input port switching scheme according to an embodiment of the present invention. The video switch 1 has a first input port P1, a second input port P2, a first switch unit S1, a second switch unit S2, a microcontroller unit 11, and an output port 2. The first input port P1 includes a first Transition Minimized Differential Signaling (TMDS) transmission channel T1 for transmitting a first TMDS signal TMDS(1) and a first Inter-Integrated Circuit (I2C) channel I1 for transmitting a first I2C signal I2C(1). The second input port P2 includes a second TMDS transmission channel T2 for transmitting a second TMDS signal TMDS(2) and a second I2C channel I2 for transmitting a second I2C signal I2C(2). Although only two input ports P1 and P2 are shown in this embodiment, more input ports may be provided.

The first switch unit S1 is coupled to the first I2C channel I1 and the second I2C channel I2; it can be selectively switched to the first I2C channel I1 to output the first I2C signal I2C(1) to the output port 2. The second switch unit S2 is coupled to the first TMDS transmission channel T1 and the second TMDS transmission channel T2; it can be selectively switched to the first TMDS transmission channel T1 to output the first TMDS signal TMDS(1) to the output port 2. As shown in FIG. 3, at this time the output port 2 outputs the video image of the first input port P1.

At this time, if the video image is to be switched from the first input port P1 to the second input port P2, the Hot Plug Detection (HPD) pin of the second port P2 is first pulled to a high voltage level from a low voltage level, and the first switch unit S1 switches from the first I2C channel I1 to the second I2C channel I2. Continue to refer to FIG. 3, at this time, the process begins to read the Extended Display Identification Data (EDID) from the second input port P2 and to perform High-Bandwidth Digital Content Protection (HDCP) authentication (i.e. the first authentication). In this embodiment, this time period is defined as a specific time period; i.e., this specific time period is the time period for reading the EDID ($T_{EDID}$) and the time period for performing HDCP first authentication ($T_{auth1}$). It should be noted that, within this specific time period, the second switch unit S2 will output the first TMDS signal TMDS(1) so as to maintain the output video image of the first port P1.

The microcontroller unit 11, which is coupled to the first switch unit S1 and the second switch unit S2, monitors and learns about this specific time period; and only after the specific time period has passed, the second switch unit S2 outputs the second TMDS signal TMDS(2) to the output port 2. It should be noted that before the second switch unit S2 outputs the second TMDS signal TMDS(2), an imitation load circuit 13 coupled to the second TMDS transmission channel T2 needs to the made conductive, so that the second input port P2 deems the output port 2 to be present and will start the EDID reading and the HDCP authentication (first authentication) process by the second input port P2. In this embodiment, the imitation load circuit 13 may be a simple switching circuit, but is not limited to such. Also, in the illustrated embodiment, each TMDS transmission channel (T1, T2 respectively) has an imitation load circuit (12, 13 respectively) coupled to it, but in alternative embodiments, one imitation load circuit may be provided and coupled to all of the TMDS transmission channels; a simple control circuit may be used to respectively make it conductive with one of the TMDS transmission channel as needed.

As seem from the lower part of FIG. 3, by using the above asynchronous switching technique, the output TMDS signal TMDS(out) can remain uninterrupted. The blank screen produced during the EDID reading time period and HDCP authentication time period (i.e. $T_{EDID}$ and $T_{auth1}$) in conventional technology is replaced in this embodiment, by using the above switching method, with the video image of the first input port. In short, by using such a transition image, the blank screen is replaced; moreover, by using the asynchronous switching technique, i.e. to switch the I2C signal first and then switch the TMDS signal, the video image switching time can be reduced to approximately 0.3 to 1 second.

In this embodiment, each time the input port is switched, the microcontroller unit monitors and learns the duration of the EDID reading time period ($T_{EDID}$) and HDCP authentication time period ($T_{auth1}$), and uses these time durations as the basis for switching the video images next time. It should be noted that the embodiments of the present invention are applicable to switching images of the same resolution.

Figure 4:
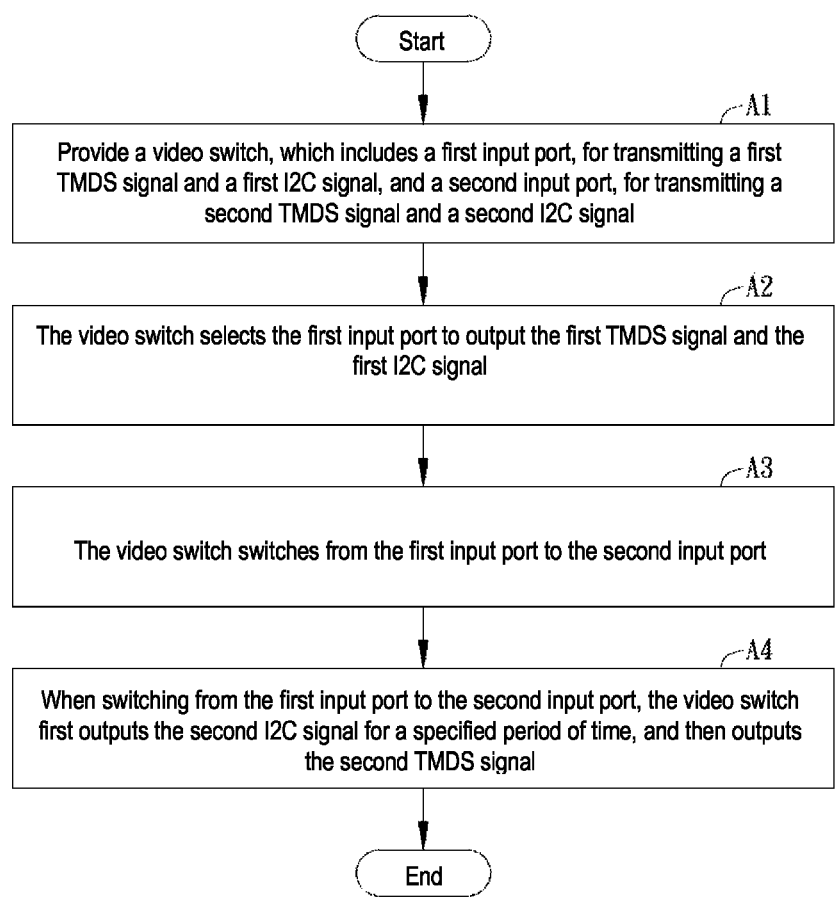
FIG. 4 schematically illustrates a video switching method according to an embodiment of the present invention.
Figure 5:
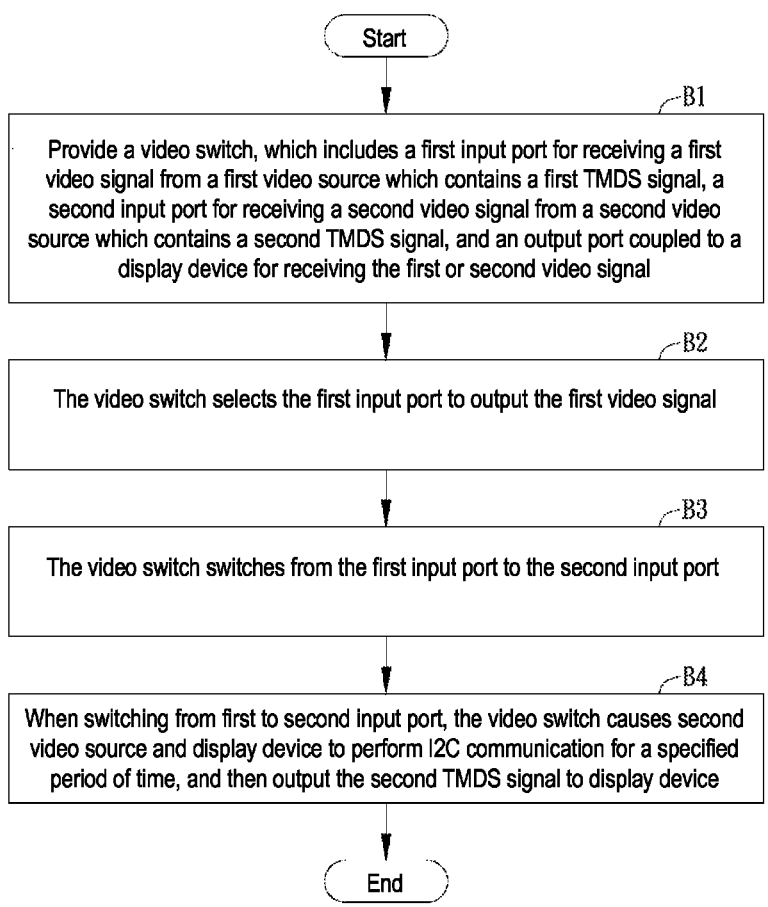
FIG. 5 schematically illustrates a video switching method according to another embodiment of the present invention.

An embodiment of the present invention also provides a video switching method, as shown in FIG. 4, which includes the following steps: (A1) providing a video switch, which includes a first input port, for transmitting a first TMDS signal and a first I2C signal, and a second input port, for transmitting a second TMDS signal and a second I2C signal; (A2) the video switch selecting the first input port to output the first TMDS signal and the first I2C signal; (A3) the video switch switching from the first input port to the second input port; and (A4) when switching from the first input port to the second input port, the video switch first outputting the second I2C signal for a specified period of time, and then outputting the second TMDS signal.

The hardware structure and the detailed switching method are described in the embodiments above and not repeated here.

Another embodiment of the present invention provides a video switching method, which includes the following steps: (B1) providing a video switch, which includes a first input port for receiving a first video signal from a first video source which contains a first TMDS signal, a second input port for receiving a second video signal from a second video source which contains a second TMDS signal, and an output port coupled to a display device for receiving the first or second video signal; (B2) the video switch selecting the first input port to output the first video signal; (B3) the video switch switching from the first input port to the second input port; and (B4) when switching from the first input port to the second input port, the video switch causing the second video source and the display device to perform I2C communication for a specified period of time, and then outputting the second TMDS signal to the display device.

Differences between this embodiment and the earlier-described embodiment include that, the first input port P1 can receive the first video signal (not shown in the drawings) from the coupled first video source (not shown in the drawings), and the first video signal can include a first TMDS signal; the second input port P2 can receive the second video signal (not shown in the drawings) from the coupled second video source (not shown in the drawings), and the second video signal can include a second TMDS signal; the output port 2 can be coupled to the display device which can receive and display the first or second video signal. The switching method and effect are similar to the earlier-described embodiment and are not repeated here.

Compared to conventional technologies, the video switch and related switching method according to embodiments of the present invention have the following advantages: By using simple hardware and asynchronous switching of I2C and TMDS signals, image-out time can be improved with relatively low cost, and the blank screen during video switching is prevented. In other words, it can use a transition image to replace the blank screen, and the asynchronous switching can reduce the switching time to less than 1 second.

Descriptions of the preferred embodiments are given above to illustrate the principle and features of the present invention, and do not limit the scope of the invention. To the contrary, it is intended that the present invention cover modifications and variations that come within the scope of the appended claims and their equivalents. The scope of the invention should be interpreted broadly based on the above disclosure to cover variations and equivalent structures and methods.

What is claimed is:

1. A video switch comprising:
   a first input port, including a first Transition Minimized Differential Signaling (TMDS) transmission channel for transmitting a first TMDS signal and a first Inter-Integrated Circuit (I2C) channel for transmitting a first I2C signal;
   a second input port, including a second TMDS transmission channel for transmitting a second TMDS signal and a second I2C channel for transmitting a second I2C signal;
   a first switch unit, coupled to the first I2C channel and the second I2C channel I2, being selectively switched to the first I2C channel to output the first I2C signal; and
   a second switch unit, coupled to the first TMDS transmission channel and the second TMDS transmission channel, being selectively switched to the first TMDS transmission channel to output the first TMDS signal;
   wherein when switching from the first input port to the second input port, the first switch unit is selectively switched to the second I2C channel to output the second I2C signal, and after a specified time period during which the first switch unit outputs the second I2C signal, the second switch unit outputs the second TMDS signal.

2. The video switch of claim 1, further comprising an imitation load circuit, for providing an imitation load signal to be output by the second input port before the second switch unit outputs the second TMDS signal.

3. The video switch of claim 2, wherein during the specified time period the second switch unit outputs the first TMDS signal.

4. The video switch of claim 1, wherein when switching from the first input port to the second input port, the first switch unit switches from the first I2C channel to the second I2C channel after a Hot Plug Detection (HPD) pin of the second input port is pulled from a low voltage level to a high voltage level.

5. The video switch of claim 1, wherein the specified time period includes a time period for reading Extended Display Identification Data (EDID) and a time period for performing High-Bandwidth Digital Content Protection (HDCP) first authentication.

6. The video switch of claim 5, further comprising a microcontroller unit, coupled to the first switch element and the second switch element, wherein the specified time period is determined by the microcontroller monitoring the time period for reading the EDID and the time period for performing the HDCP first authentication.

7. The video switch of claim 1, wherein a resolution of the first TMDS signal is equal to a resolution of the second TMDS signal.

8. A video switching method comprising:
   providing a video switch, which includes a first input port for transmitting a first Transition Minimized Differential Signaling (TMDS) signal and a first Inter-Integrated Circuit (I2C) signal and a second input port for transmitting a second TMDS signal and a second I2C signal;
   selecting, by the video switch, the first input port to output the first TMDS signal and the first I2C signal;
   switching, by the video switch, from the first input port to the second input port; and
   when switching from the first input port to the second input port, first outputting, by the video switch, the second I2C signal for a specified period of time, and then outputting the second TMDS signal.

9. The video switching method of claim 8, further comprising:
   providing an imitation load circuit, for outputting an imitation load signal to be output by the second input port before the video switch outputs the second TMDS signal.

10. The video switching method of claim 8, wherein a resolution of the first TMDS signal is equal to a resolution of the second TMDS signal.

11. The video switching method of claim 8, wherein when switching from the first input port to the second input port, the video switch outputs the second I2C signal after a Hot Plug Detection (HPD) pin of the second port is pulled to a high voltage level.

12. The video switching method of claim 8, further comprising:
   providing a microcontroller unit, which monitors the second I2C signal to determine the specified time period for a next switching operation.

13. The video switching method of claim 12, wherein the second I2C signal includes reading Extended Display Identification Data (EDID) and performing High-Bandwidth Digital Content Protection (HDCP) first authentication, and wherein the specified time period includes a time period for reading the EDID and a time period for performing the HDCP first authentication.

14. A video switching method comprising:
   providing a video switch, including a first input port for receiving a first video signal from a first video source which contains a first TMDS signal, a second input port for receiving a second video signal from a second video source which contains a second TMDS signal, and an output port coupled to a display device for receiving the first or second video signal;
   selecting, by the video switch, the first input port to output the first video signal;
   switching, by the video switch, from the first input port to the second input port; and
   when switching from the first input port to the second input port, causing, by the video switch, the second video source and the display device to perform I2C communication for a specified period of time, and then outputting the second TMDS signal to the display device.

15. The video switching method of claim 14, further comprising:
   providing an imitation load circuit, for outputting an imitation load signal to the second video source via the second input port before the video switch outputs the second TMDS signal to the display device, so that the second video source and the display device perform I2C communication.

16. The video switching method of claim 14, wherein a resolution of the first TMDS signal is equal to a resolution of the second TMDS signal.

17. The video switching method of claim 14, wherein when switching from the first input port to the second input port, the video switch performs the I2C communication after a Hot Plug Detection (HPD) pin of the second port is pulled to a high voltage level.

18. The video switching method of claim 14, further comprising:
   providing a microcontroller unit, which monitors the I2C communication to determine the specified time period for a next switching operation.

19. The video switching method of claim 18, wherein the I2C communication includes reading Extended Display Identification Data (EDID) and performing High-Bandwidth Digital Content Protection (HDCP) first authentication, and wherein the specified time period includes a time period for reading the EDID and a time period for performing the HDCP first authentication.

\* \* \* \* \*